United States Patent
Guthrie

(10) Patent No.: US 8,675,186 B2
(45) Date of Patent: Mar. 18, 2014

(54) SYSTEMS AND METHODS FOR TARGETING DIRECTED ENERGY DEVICES

(75) Inventor: Richard W. Guthrie, Moorpark, CA (US)

(73) Assignee: The Boeing Company, Chicago, IL (US)

( * ) Notice: Subject to any disclaimer, the term of this patent is extended or adjusted under 35 U.S.C. 154(b) by 284 days.

(21) Appl. No.: 13/117,360

(22) Filed: May 27, 2011

(65) Prior Publication Data

US 2011/0226932 A1 Sep. 22, 2011

Related U.S. Application Data

(62) Division of application No. 12/130,556, filed on May 30, 2008, now Pat. No. 7,978,313.

(51) Int. Cl.
*G01S 3/786* (2006.01)
*G01S 17/66* (2006.01)
*G01S 7/495* (2006.01)

(52) U.S. Cl.
CPC .......... *G01S 17/66* (2013.01); *G01S 3/786* (2013.01); *G01S 7/495* (2013.01)
USPC .............. 356/139.06; 356/139.08; 356/141.4

(58) Field of Classification Search
USPC ............ 356/139.04, 139.06, 139.07, 139.08, 356/141.1, 141.4, 141.5, 152.2
See application file for complete search history.

(56) References Cited

U.S. PATENT DOCUMENTS

| | | | | |
|---|---|---|---|---|
| 2,734,269 A | * | 2/1956 | Claret | 250/203.6 |
| 2,965,762 A | * | 12/1960 | Turck | 250/206.3 |
| 3,532,432 A | * | 10/1970 | Mansour | 356/121 |
| 3,603,686 A | * | 9/1971 | Paine et al. | 356/139.08 |
| 3,681,528 A | * | 8/1972 | Henderson | 348/169 |
| 3,989,947 A | * | 11/1976 | Chapman | 250/338.1 |
| 4,063,819 A | | 12/1977 | Hayes | |
| 4,155,096 A | * | 5/1979 | Thomas et al. | 348/169 |
| 4,193,688 A | * | 3/1980 | Watkins | 356/139.04 |
| 4,386,848 A | * | 6/1983 | Clendenin et al. | 356/5.01 |
| 4,401,886 A | * | 8/1983 | Pond et al. | 250/203.1 |
| 4,635,299 A | * | 1/1987 | MacGovern | 398/129 |
| 4,737,028 A | * | 4/1988 | Smith | 356/139.08 |
| 4,776,691 A | * | 10/1988 | Johnson et al. | 356/152.1 |
| 4,798,462 A | * | 1/1989 | Byren | 356/139.08 |
| 4,896,032 A | * | 1/1990 | Ball et al. | 250/251 |
| 5,197,691 A | * | 3/1993 | Amon et al. | 244/3.13 |
| 5,216,236 A | | 6/1993 | Blais | |
| 5,253,033 A | * | 10/1993 | Lipchak et al. | 356/4.01 |
| 5,410,815 A | * | 5/1995 | Parikh et al. | 42/115 |

(Continued)

OTHER PUBLICATIONS

Ahmed Erteza, "Boresighting a Gaussian beam on a specular target point: a method using conical scan," Appl. Opt. 15, 656-660 (1976).*

(Continued)

*Primary Examiner* — Luke D Ratcliffe
*Assistant Examiner* — Ari M Diacou
(74) *Attorney, Agent, or Firm* — Toler Law Group, PC

(57) ABSTRACT

Systems and methods for targeting a directed energy system are provided. A particular system includes a first laser and a second laser. The system also includes a scanning system coupled to the first laser and the second laser. The scanning system is adapted to movably direct the second laser in a pattern around a pointing location of the first laser.

20 Claims, 7 Drawing Sheets

(56) References Cited

U.S. PATENT DOCUMENTS

| | | | | |
|---|---|---|---|---|
| 5,457,310 | A | * | 10/1995 | Fournier ................. 250/206.2 |
| 5,476,385 | A | * | 12/1995 | Parikh et al. ................. 434/22 |
| 5,672,872 | A | * | 9/1997 | Wu et al. ................. 250/330 |
| 5,780,838 | A | * | 7/1998 | Livingston et al. ........ 250/203.2 |
| 5,780,839 | A | | 7/1998 | Livingston |
| 5,832,020 | A | | 11/1998 | Kong |
| 5,841,125 | A | | 11/1998 | Livingston |
| 5,936,229 | A | | 8/1999 | Livingston |
| 5,955,724 | A | | 9/1999 | Livingston |
| 5,995,724 | A | * | 11/1999 | Mikkelsen et al. ......... 358/1.16 |
| 6,069,656 | A | * | 5/2000 | Silver ................. 348/169 |
| 6,128,410 | A | * | 10/2000 | Park et al. ................. 382/218 |
| 6,145,784 | A | | 11/2000 | Livingston |
| 6,153,871 | A | | 11/2000 | Livingston |
| 6,172,826 | B1 | | 1/2001 | Livingston |
| 6,250,583 | B1 | | 6/2001 | Livingston |
| 6,265,704 | B1 | | 7/2001 | Livingston |
| 6,343,766 | B1 | | 2/2002 | Livingston |
| 6,366,594 | B1 | | 4/2002 | Bauer et al. |
| 6,553,054 | B1 | | 4/2003 | Bauer et al. |
| 6,693,272 | B2 | * | 2/2004 | Adachi et al. ................. 250/216 |
| 6,961,171 | B2 | * | 11/2005 | Byren et al. ................. 359/333 |
| 7,044,044 | B2 | | 5/2006 | Rodriquez et al. |
| 7,323,670 | B2 | * | 1/2008 | Walsh et al. ................. 250/205 |
| 7,436,493 | B2 | * | 10/2008 | McConville et al. ........ 356/4.01 |
| 7,962,265 | B2 | * | 6/2011 | Pinney ................. 701/49 |
| 8,170,731 | B2 | * | 5/2012 | Martinez et al. ................. 701/11 |
| 8,212,996 | B2 | * | 7/2012 | Bhargava et al. ............ 356/4.01 |
| 2003/0133091 | A1 | * | 7/2003 | Kongable ................. 356/4.01 |
| 2004/0233420 | A1 | * | 11/2004 | Deflumere et al. ...... 356/139.03 |
| 2005/0175349 | A1 | * | 8/2005 | Guyer et al. ................. 398/134 |
| 2006/0215148 | A1 | * | 9/2006 | Yamaguchi et al. ......... 356/4.01 |
| 2006/0244978 | A1 | * | 11/2006 | Yamada et al. ................. 356/614 |
| 2010/0126335 | A1 | * | 5/2010 | Saban et al. ................. 89/36.01 |
| 2012/0081690 | A1 | * | 4/2012 | Nagai et al. ................. 356/4.01 |

OTHER PUBLICATIONS

U.S. Appl. No. 12/130,556, Non-Final Office Action dated May 25, 2010, (7 pgs).

* cited by examiner

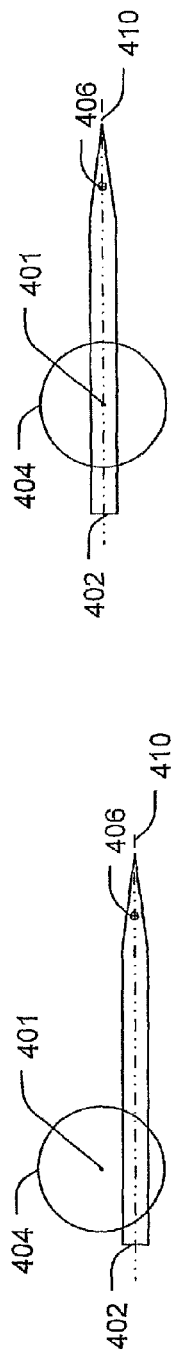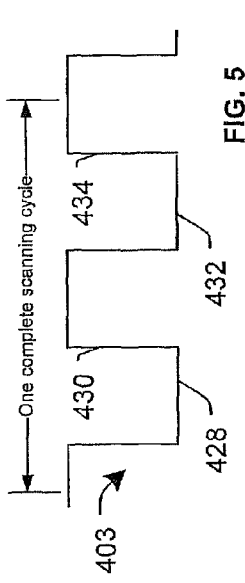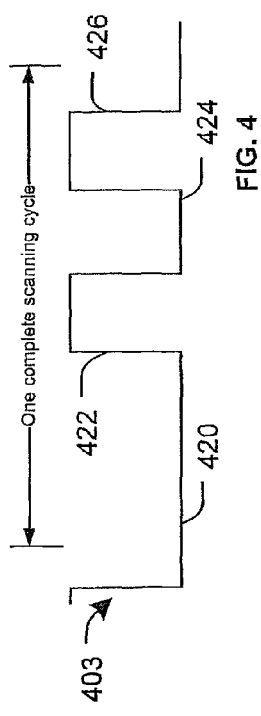

SYSTEMS AND METHODS FOR TARGETING DIRECTED ENERGY DEVICES

CROSS REFERENCE TO RELATED APPLICATIONS

The present application is a divisional application of and claims priority to U.S. patent application Ser. No. 12/130,556 filed on May 30, 2008 and entitled "SYSTEMS AND METHODS FOR TARGETING DIRECTED ENERGY DEVICES," now U.S. Pat. No. 7,978,313, the contents of which are expressly incorporated herein by reference in their entirety.

FIELD OF THE DISCLOSURE

The present disclosure is generally related to targeting directed energy devices.

BACKGROUND

Advances in technology have led to the development of directed energy devices that may be used to attack targets. Directed energy devices may be useful for airborne targets that move relatively quickly. Targeting systems for directed energy devices may include imaging systems that aim the directed energy devices at the target based on optical images of the target. Gathering and analyzing imaging data may be time consuming and computationally challenging and may be subject to atmospheric interferences. Other directed energy devices may be targeted by diverting a portion of a primary energy beam for sampling to determine a pointing direction of the primary energy beam relative to the target or by sensing the pointing direction of the primary energy beam based on reflected energy of the primary energy beam. Using reflected energy of the primary beam for targeting typically means that some portion of the energy of the primary energy beam is not focused on the targeted and is therefore wasted. Hence, improved systems and methods of targeting directed energy devices are needed.

SUMMARY

Systems and methods for targeting a directed energy system are provided. A particular system includes a first laser and a second laser. The system also includes a scanning system coupled to the first laser and the second laser. The scanning system is adapted to movably direct the second laser in a pattern around a pointing location of the first laser.

In another particular embodiment, a method includes shining a first laser onto a target and moving the first laser in a curvilinear pattern over the target. The method also includes detecting reflections of the first laser from the target. The method further includes pointing a second laser at the target based on the detected reflections.

In another particular embodiment, a control system includes a detector interface to receive a detection signal including information regarding detected reflections of a targeting laser. The control system also includes a scanning module to determine a curvilinear scanning pattern in which to move the targeting laser based on target information related to a target. The control system further includes a targeting module to determine when a center of the curvilinear scanning pattern substantially coincides with a targeting location on the target based on the detected reflections.

In another particular embodiment, a computer-readable medium includes instructions that, when executed by a processor, cause the processor to determine a curvilinear scanning pattern based on information related to a target. The computer-readable medium also includes instructions that, when executed by the processor, cause the processor to determine when a center of the curvilinear pattern substantially coincides with a targeting location on the target based on detected reflections from the target.

The features, functions, and advantages that have been disclosed can be achieved independently in various embodiments or may be combined in yet other embodiments further details of which can be understood with reference to the following description and drawings.

BRIEF DESCRIPTION OF THE DRAWINGS

FIG. 4 is a diagram illustrating a first embodiment of a method of targeting a directed energy device;

FIG. 5 is a diagram illustrating a second embodiment of a method of targeting a directed energy device;

FIG. 6 is a diagram illustrating a third embodiment of a method of targeting a directed energy device;

FIG. 7 is a diagram illustrating a fourth embodiment of a method of targeting a directed energy device;

DETAILED DESCRIPTION

Figure 1:
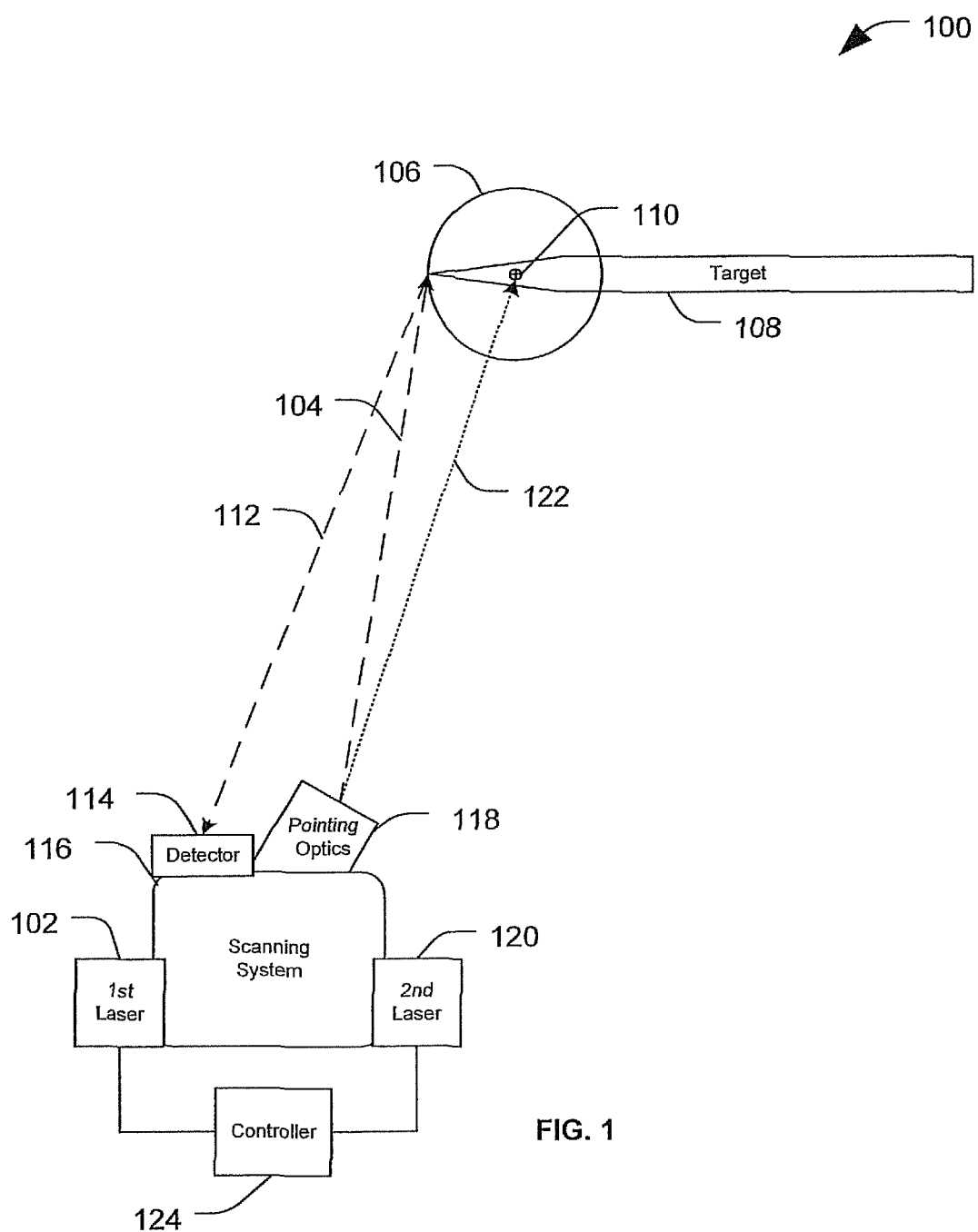
FIG. 1 is a diagram of a first embodiment of a directed energy system.

FIG. 1 depicts a first particular embodiment of a directed energy system, designated generally 100. The directed energy system 100 includes two or more directed energy devices, such as a first laser 102 and a second laser 120. In another particular embodiment, the directed energy system 100 includes one or more other types of directed energy devices, such as, but not limited to a maser device, a particle beam device, or another device adapted to emit light, electromagnetic radiation or energetic particles in a directional manner.

The directed energy system 100 provides a mechanism for targeting the first laser 102 such that a primary beam 122 projected from the first laser 102 strikes a target 108 at a targeting location 110. The target 108 may include a missile, a rocket propelled grenade, a mortar round, an artillery round, an aircraft, or another airborne, land-based, water-based, or space-based target. The directed energy system 100 may be stationary or mobile. Additionally, the directed energy system 100 may be land-based, ship-based, airborne (e.g., onboard an airplane or other aircraft) or space-based (e.g., onboard an orbiting satellite). In a particular illustrative embodiment, the first laser 102 is a high energy laser capable of damaging or destroying the target 108 from a relatively large distance and the second laser 120 is a lower energy power capable of generating a scanning beam 104 with enough energy for reflections 112 of the beam 104 to be detected by a detector 114 of the directed energy system 100.

In a particular embodiment, the directed energy system 100 includes a controller 124 adapted to control the first laser 102 and the second laser 120. For example, the first laser 102 may emit the primary beam 122 via the optics 118 in response to a fire signal received from the controller 124. The second laser 120 may be adapted to emit the scanning beam 104 via the optics 118 in response to a scan signal from the controller 124. Thus, at least a portion of the optics 118 may be shared by the first laser 102 and the second laser 120.

The scanning beam 104 may be moved in a curvilinear pattern 106 via the scanning system 116. The scanning system 116 may be coupled to the first laser 102 and the second laser 120 and may be adapted to moveably direct the scanning beam 104 in the curvilinear pattern 106 around a pointing location of the first laser 102. For example, the scanning system 116 may include a mirror adapted to rotate or otherwise move the scanning beam 104 from the second laser 120 to scan the target 108. The curvilinear pattern 106 may include a circle, an ellipse, another curvilinear pattern (such as a Lissajous loop), or any combination thereof.

In a particular embodiment, the controller 124 is adapted to determine when the first laser 102 is pointed at the targeting location 110 on the target 108 based on the detected reflections 112 of the scanning beam 104. For example, the reflections 112 from the scanning beam 104 may be received by the detector 114. The detector 114 is adapted to detect reflected energy of the scanning beam 104 from the target 108 and to provide a detection signal related to the reflected energy to the controller 124. The controller 124 may receive the detection signal and may determine, based on the detection signal, when a center of the curvilinear pattern 106 substantially coincides with a targeting location 110 on the target 108. In a particular embodiment, the first laser 102 and the second laser 120 have different frequencies to facilitate differentiation of the beams 104, 122 by the detector 114 and to facilitate alignment of the beams 104, 122 by the optics 118.

In a particular embodiment, when the center of the curvilinear pattern 106 coincides with the targeting location 110, the controller 124 sends a fire signal to the first laser 102. In response to the fire signal, the first laser 102 may shine the primary beam 122 on the target 108. In an illustrative embodiment, the primary beam 122 is aligned with the scanning beam 104 such that the primary beam 122 is directed substantially in line with the center of the curvilinear pattern 106. To illustrate, when the center of the curvilinear pattern 106 coincides with the targeting location 110, the pointing location of the first laser 102 also coincides with the targeting location 110. By scanning the target 108 using the second laser 120 and by aligning the first laser 102 with the center of the curvilinear pattern 106, energy of the first laser 102 may be substantially focused on the targeting location 110 of the target 108, thereby increasing the amount of the energy of the primary energy beam 122 that strikes the targeting location 110.

Figure 2:
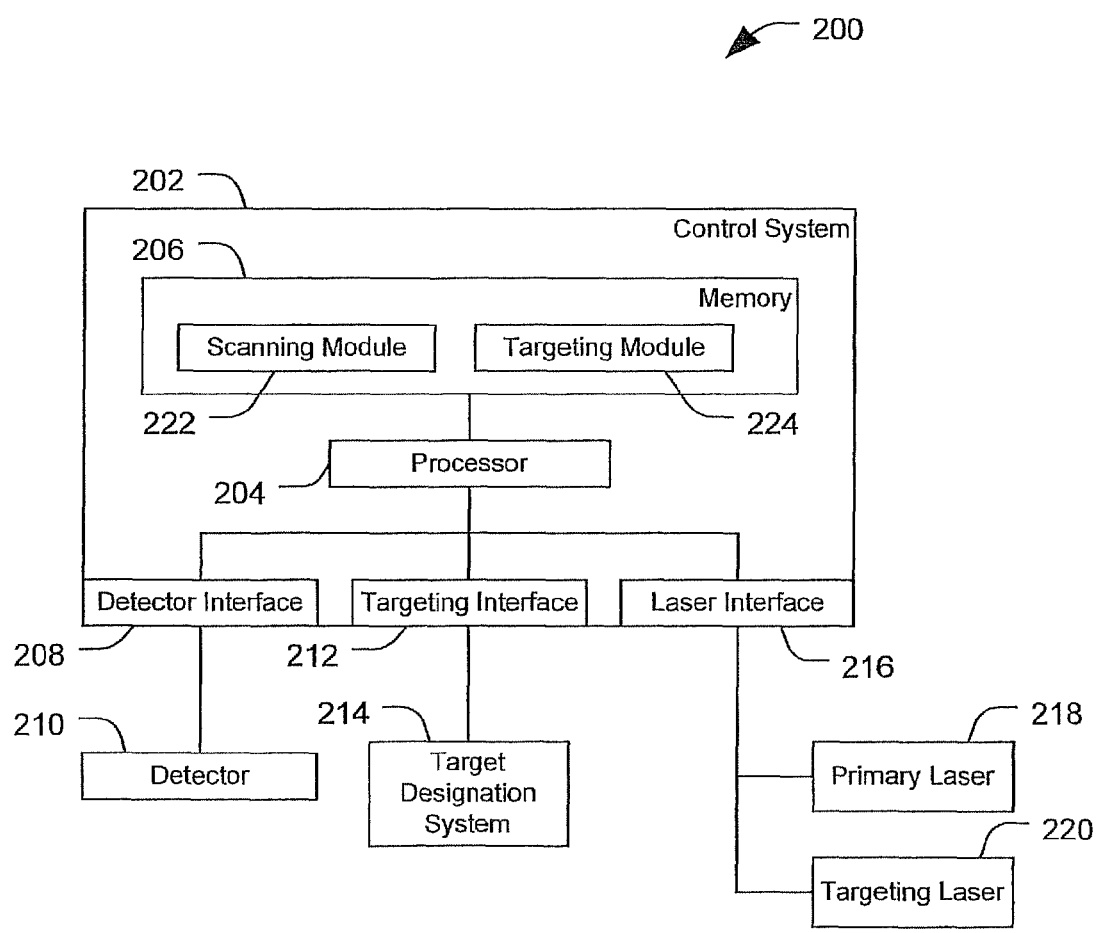
FIG. 2 is a block diagram of a second embodiment of a directed energy system.

FIG. 2 depicts a second particular embodiment of a directed energy system, designated 200. The directed energy system 200 includes a control system 202 adapted to facilitate targeting and operation of one or more directed energy devices, such as a primary laser 218 and a targeting laser 220. The control system 202 may include a number of interfaces to facilitate communication with one or more external systems, such as a detector interface 208 adapted to interface with a detector 210, a targeting interface 212 adapted to interface with a target designation system 214 and a laser interface 216 adapted to interface with the lasers 218, 220. The control system 202 may also include a processor 204 and a memory 206 accessible to the processor 204. The memory 206 may include one or more modules adapted to perform various functions of the control system 202. For example, the modules may include a scanning module 222 and a targeting module 224. The modules 222 and 224 may be implemented in software (e.g., instructions stored in a computer-readable medium, such as the memory 206), implemented in hardware, or any combination thereof.

In a particular embodiment, the control system 202 receives target information from the target designation system 214. The target designation system 214 may be adapted to select the particular target and to determine the target information with respect to the selected target. The target information may include a distance to the target, an orientation of the target, a type of the target, a position of the target in space (e.g., coordinates of the target location), a targeting location for the target (e.g., a location on the target at which the directed energy device should be aimed), other information regarding the target, or any combination thereof. The control system 202 may receive the target information and provide the target information to the scanning module 222. The scanning module 222 may determine a curvilinear scanning pattern in which to move the targeting laser 220 based on the target information. For example, the curvilinear scanning pattern may be selected such that the radius of the curvilinear scanning pattern is substantially equal to a distance from a feature on the target to the target location of the target. To illustrate, the radius of the curvilinear scanning pattern may be selected such that a distance from the nose of the target to the target location is equal to the radius of the curvilinear pattern.

In a particular embodiment, the targeting laser 220 and the primary laser 218 are aligned such that a pointing direction of the primary laser is aligned with the center of the curvilinear pattern. The targeting module 224 may be adapted to determine when the center of the curvilinear scanning pattern coincides with the targeting location. For example, the targeting module 224 may receive a detection signal from the detector 210 via the detector interface 208. The detection signal may be analyzed by the targeting module 224 to determine when the center of the curvilinear scanning pattern coincides with the target location. When the center of the curvilinear scanning pattern coincides with the target location, the targeting module 224 may send a fire signal to the primary laser 218. The primary laser 218 may fire a high energy laser substantially at the center of the curvilinear scanning pattern. Thus, the primary laser 218 may be directed at the targeting location of the target based on the detected reflections from the targeting laser 220.

Figure 3:
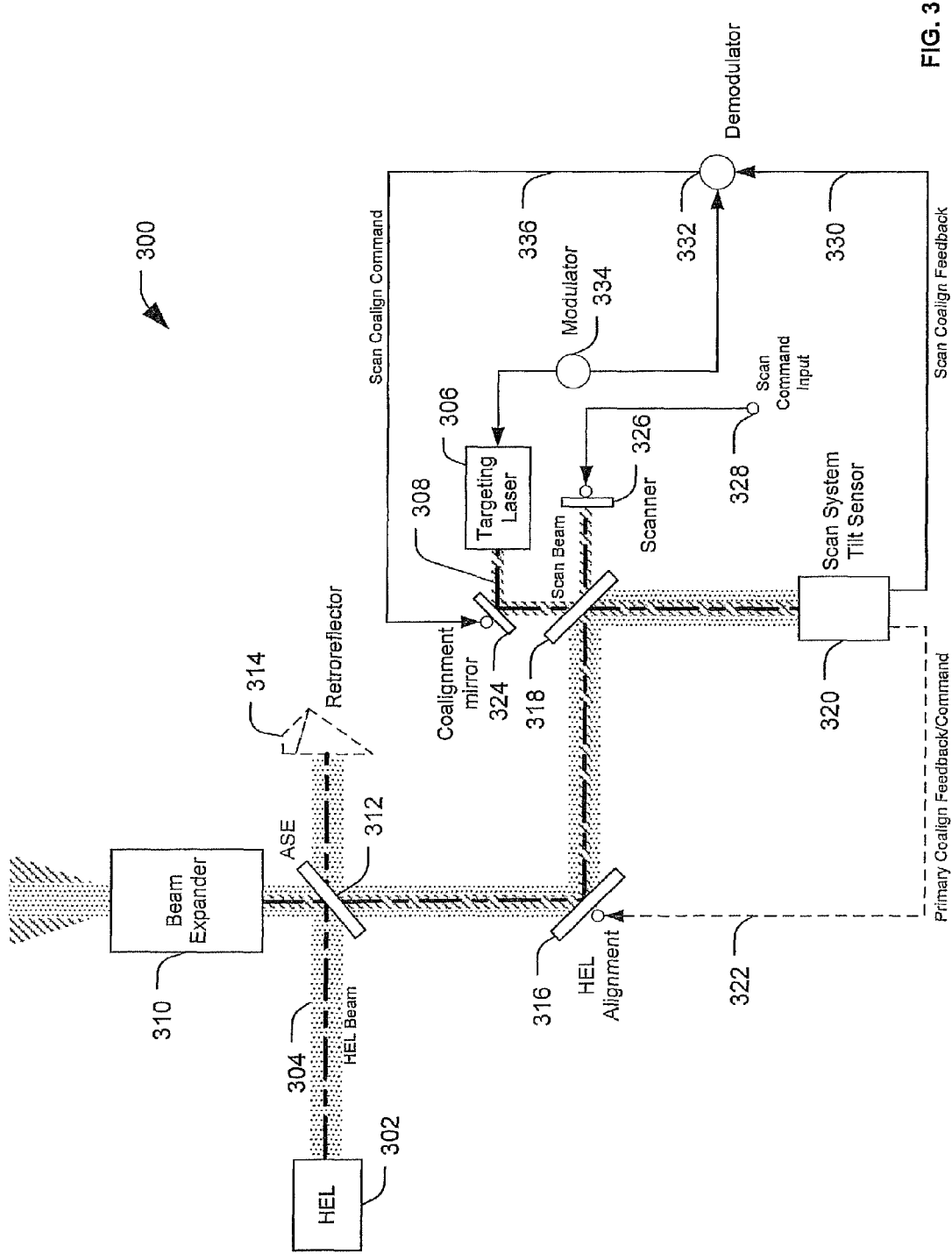
FIG. 3 is a diagram of a third embodiment of a directed energy system.

FIG. 3 depicts a third particular embodiment of a directed energy system, designated 300. The directed energy system 300 includes a high energy laser (HEL) 302 and a targeting laser 306. A HEL beam 304 of the HEL 302 and a scan beam 308 of the targeting laser 306 are aligned and pointed via shared optics, such as a beam expander 310, a HEL alignment mirror 316, and a co-alignment mirror 324. A scan system tilt sensor 320 monitors alignment of the beams 304, 308 and generates control signals 322, 330 to adjust the alignment of the beams 304, 308.

The HEL 302 projects the HEL beam 304 to an aperture sharing element (ASE) that splits the HEL beam 304. A main portion of the HEL beam 304 is directed out via the beam expander 310 toward a target. A sample portion of the HEL beam 304 is directed to a retroreflector 314. The retroreflector 314 reflects the sample portion of the HEL beam 304 via the ASE 312 to the HEL alignment mirror 316. The HEL alignment mirror 316 directs the sample portion of the HEL beam 304 to a scan system tilt sensor 320 via a beam splitter 318.

The targeting laser 306 projects the scan beam 308 to the co-alignment mirror 324. The co-alignment mirror 324 reflects the scan beam 308 toward the beam splitter 318. The beam splitter 318 separates the scan beam 308 into two portions, a main portion and a sample portion. The sample portion passes through the beam splitter 318 to shine on the scan system tilt sensor 320. Based on the sample portion of the HEL beam 304 and the sample portion of the scan beam 308, the scan system tilt sensor 320 may generate the control signals 322, 330 to adjust alignment of the HEL beam 304 and the scan beam 308. In a particular illustrative embodiment, the beams 304, 308 may be aligned such that the HEL beam 304 is directed substantially to an average center of the scan beam 308. To illustrate, an HEL alignment control signal 322 may be used to adjust the HEL alignment mirror 316 to substantially center the HEL beam 304 on the scan system tilt sensor 320. Subsequently, a scan coalign feedback control signal 330 may be used to adjust the coalignment mirror 324 to align the beams 304, 308.

The scan co-alignment control signal 330 is sent from the scan system tilt sensor 320 to a demodulator 332 that distinguishes between the frequencies of the HEL beam 304 and the scan beam 308 based on a modulation signal received from a modulator 334. The demodulator generates a scan coalign command 336 used to drive the coalignment mirror 324. The modulator 334 modulates the scan beam 308 so that the scan beam 308 and the HEL beam 304 are distinguishable. For example, the beams 304, 308 may have different frequencies based on the modulator 334.

The main portion of the scan beam 308 is directed to a scan mirror 326. The scan mirror 326 is movable based on a scan command input 328. For example, the scan mirror 326 may rotate to move the scan beam in a curvilinear pattern. The scan mirror 326 reflects the main portion of the scan beam 308 through the beam expander 310 via the HEL alignment mirror 316. The particular curvilinear pattern formed by the scan beam 308 may be selected based on information about the target, such as an orientation of the target, a type of the target, a distance to the target, a targeting location on the target, other information about the target, or any combination thereof. Energy of the scan beam 308 reflected by the target may be received and analyzed and used to determine when the pointing direction of the HEL beam 304 is aligned with the targeting location of the target. When the HEL beam 304 is pointed at the target location of the target, the HEL 302 may be initiated to shine the HEL beam 304 on the target. Thus, the HEL beam 304 may be projected onto the targeting location without expending energy of the HEL beam 304 while the HEL beam 304 is not aligned with the targeting location.

FIGS. 4-9 depict various embodiments of targeting directed energy systems at targets 402. FIG. 4 depicts a first particular embodiment in which a directed energy device, such as a laser, is directed toward a target 402 and moves in a curvilinear pattern 404. In the embodiment depicted in FIG. 4, a center 401 of the curvilinear pattern 404 is not aligned vertically with the target 402. Such an arrangement may occur when a targeting laser is initially scanned in the curvilinear pattern 404 toward the target 402 in an attempt to center the curvilinear pattern 404 at a targeting location 406 of the target 402. To illustrate, the targeting laser may be pointed generally at the target 402 based on target information. The initial scans of the targeting laser may not be centered at the targeting location 406, and thus, may be misaligned in the manner illustrated in FIG. 4.

A reflection signal 403 based on reflected energy of the targeting laser is also depicted in FIG. 4. The reflection signal 403 illustrates one complete scan cycle of the targeting laser. The reflection signal 403 includes a long period with no reflection indicated by 420 which corresponds to a portion of the curvilinear pattern 404 above the target 402. The reflected signal 403 also includes a reflection peak 422 corresponding to a portion of the curvilinear pattern 404 when the targeting laser is reflected from the target followed by a relatively short period of no reflection 424 corresponding to the portion of the curvilinear pattern 404 below the target 402. The period of no reflection 424 is followed by another reflection peak 426 corresponding to the second reflected signal from the curvilinear pattern 404.

When the target 402 is relatively uniform in dimension, the reflection peaks 422 and 426 may be substantially equal. Thus, the relatively long period of no reflection 420, the relatively short period of no reflection 424, and the relatively even reflection peaks 422 and 426 may indicate that the curvilinear pattern 404 is above or below the target 402. By comparing the reflection signal 403 with information about the curvilinear pattern of the targeting laser, the approximate direction and distance of the center 401 of the curvilinear pattern 404 to a center line 410 of target 402 can be determined. Thus, the reflection signal 403 can be used to align the center 401 of the curvilinear pattern 404 with the center line 410 of the target 402.

In a particular embodiment, the center 401 is aligned vertically with another portion of the target 402. For example, when the target location 406 is not on the center line 410 of the target 402, an expected reflection signal can be determined based on geometric information regarding the target 402 and the received reflection signal 403 can be compared to the expected reflection signal to adjust the curvilinear pattern 404 to align the center 401 of the curvilinear pattern 404 with the target location 406 vertically. Additionally, while the illustrated target 402 has a generally cylindrical shape with a long axis roughly horizontal, as shown in FIG. 4, the reflection signal 403 can be used to align the center 401 of the curvilinear pattern 404 with a target oriented in any direction (as discussed further with reference to FIG. 8).

FIG. 5 depicts a second particular embodiment of targeting a directed energy system. In FIG. 5, the center 401 of the curvilinear pattern 404 is substantially aligned vertically with the center line 410 of the target 402. Thus, the vertical misalignment depicted in FIG. 4 has been corrected in FIG. 5. However, the center 401 of the curvilinear pattern 404 is not aligned with the targeting location 406.

In this situation, the reflection signal 403 may include substantially even periods of no reflection 428 and 432 and substantially even reflection peaks 430 and 434. The relative dimensions of the reflection peaks and periods of no reflection may depend upon dimensions of the curvilinear pattern 404 and the geometry of the target 402. For example, when the target 402 has uneven dimensions, the reflection peaks 430 and 434, the periods of no reflection 428 and 432, or both may not be even. To illustrate, when the target 402 is tapered such that it has a cross section closer to the nose that is smaller than the cross section closer to the tail, the reflection peaks 430 and 434 may be uneven and the periods of no reflection 428 and 432 may be substantially even. Information about the geometry and orientation of the target can be used to determine an expected reflection signal 403 when the curvilinear pattern is aligned vertically with the center line 410 (or other location) of the target 402.

FIG. 6 depicts a third particular embodiment of targeting a directed energy system in which the center 401 of the curvilinear pattern 404 is substantially aligned vertically with the center line 410 of the target 402 and substantially aligned horizontally with the targeting location 406 of the target 402.

As depicted in FIG. 6, the curvilinear pattern 404 has been selected such that a radius of the curvilinear pattern 404 is the same as the distance from a nose 408 of the target 402 to the targeting location 406. That is, the distance from the targeting location 406 to the nose 408 corresponds to the distance from the center 401 to the curvilinear pattern 404. The radius of the curvilinear pattern 404 may be selected based on the type of the target, the orientation of the target, the distance to the target, other information regarding the target, or any combination thereof.

The reflection signal 403 in FIG. 6 includes a first reflection peak 436 corresponding to the intersection of the curvilinear pattern with the nose 408 of the target 402. The reflection signal 403 also includes a period of no reflection 438 corresponding to a portion of the curvilinear pattern 404 above the target 402. The reflection 403 also includes a reflection peak 440 corresponding to a portion of the curvilinear pattern 404 reflected from the body of the target 402. The reflection peak 440 is followed by a period of no reflection 442 corresponding to a portion of the curvilinear pattern 404 below the target 402. In a particular embodiment, the first reflection peak 436 is relatively small compared to the second reflection peak 440 as a result of the cross section of the nose 408 being tapered for air dynamics purposes. Thus, the relatively small first reflection peak 436 may indicate that the curvilinear pattern 404 has reached the nose 408 of the target 402. Since the radius of the curvilinear pattern 404 was selected to correspond to the distance from the nose 408 to the targeting location, when the reflection signal 403 indicates that the curvilinear pattern 404 has intersected the nose 408 of the target 402, the center 401 of the curvilinear pattern 404 is approximately at the targeting location 406 horizontally. Additionally, when the periods of non reflection 438 and 442 are approximately even, the center 401 of the curvilinear pattern 404 is approximately aligned vertically with the center line 410 of the target 408. Thus, based on the reflection signal 403 of FIG. 6, the center 401 of the curvilinear pattern 404 approximately corresponds to the targeting location 406 on the target 408. In a particular embodiment, a primary or high energy laser is aligned with the center 401 of the curvilinear pattern 404 and may be fired at the target 408 after the reflection signal 403 illustrated in FIG. 6 is detected. Accordingly, the primary or high energy laser beam may shine on the targeting location 406 without using energy of the primary or high energy laser to determine proper alignment of the beam with the targeting location 406.

FIG. 7 depicts a fourth particular embodiment of targeting a directed energy system in which the curvilinear pattern 404 extends beyond the nose 408 of the target 402. The reflection signal 403 of FIG. 7 includes a period of no reflection 444 and a single reflection peak 446. The period of no reflection 444 corresponds to a portion of the curvilinear pattern 404 that does not overlap the target 402, and the reflection peak 446 corresponds to the portion of the curvilinear pattern 404 that overlaps the target 402. The curvilinear pattern 404 overlaps the target 402 only once rather than twice during a complete scan cycle. The presence of a single reflection peak 446 thus indicates that the curvilinear pattern 404 is projected beyond the target 402. Since the radius of the curvilinear pattern may be selected to correspond to the distance from the nose 408 to the targeting location 406, the reflection signal 403 of FIG. 7 may indicate that the center 401 of the curvilinear pattern 404 is further forward on the target 402 than the targeting location 406.

Figure 8:
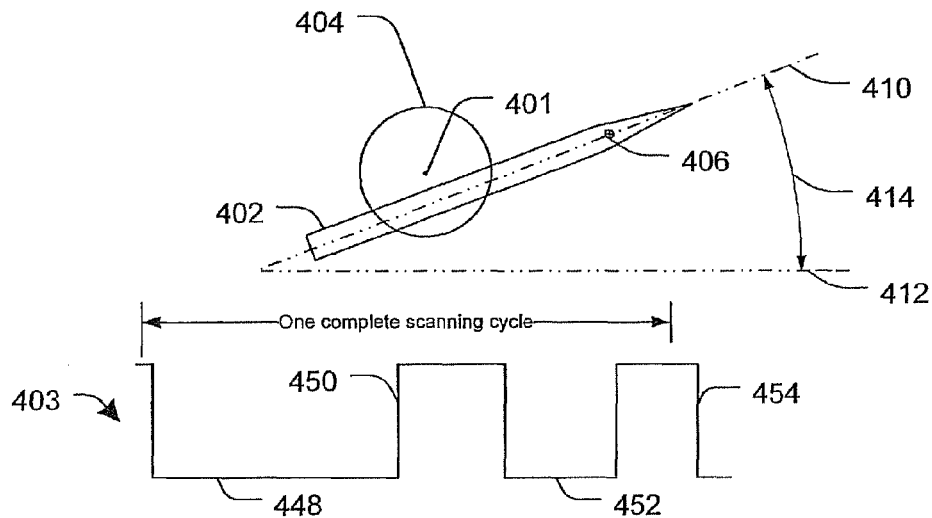
FIG. 8 is a diagram illustrating a fifth embodiment of a method of targeting a directed energy device.

FIG. 8 depicts a fifth particular embodiment of targeting a directed energy system in which an orientation of the target 402 is not horizontal. That is, the center line 410 of the target 402 is at an angle 414 relative to horizontal 412. In a particular embodiment, the orientation of the target 402 is provided to the directed energy system (e.g., a primary laser, targeting lasers, or controller as discussed with references to FIGS. 1-3). In another particular embodiment, the directed energy system determines the orientation of the target by analyzing the reflection signal 403 with respect to information about the curvilinear pattern 404.

As illustrated in FIG. 8, when the orientation of the target 402 is at an angle with respect to horizontal 412 (and the curvilinear pattern 404 overlaps the target in two places), the reflection signal 403 may include a first period of no reflection 448 and a second period of no reflection 452. For example, as illustrated, the first period of no reflection 448 corresponds to a portion of the curvilinear pattern 404 above the target, and the second period of no reflection 452 corresponds to a second portion of the curvilinear pattern below the target. The reflection signal 403 may also include reflection peeks 450 and 454. When the curvilinear pattern 404 is reflected twice from the target 402, as illustrated in FIG. 8, and when the target 402 is substantially uniform in cross section, the reflection peeks 450 and 454 may be even. In an illustrative embodiment, the first period of no reflection 448 and the second period of no reflection 452 may be uneven. The position of the reflection peaks 450 and 454 and periods of no reflection 448 and 452 in the scan cycle of the reflection signal 403 are related to the angle 414 of the target 402 with respect to horizontal 412. In a particular embodiment, the timing of the first period of no reflection 448 and the second period of no reflection 452 may be analyzed (along with information about the curvilinear pattern 404 and information about the geometry or type of the target) to determine the angle 414.

Figure 9:
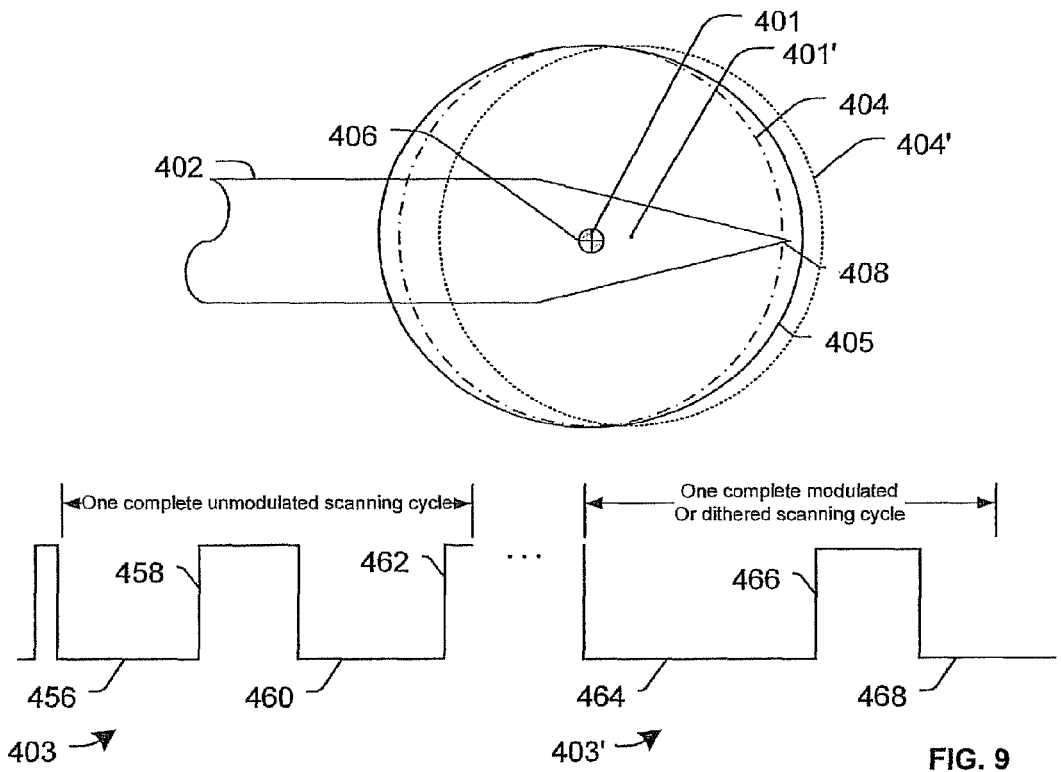
FIG. 9 is a diagram illustrating a sixth embodiment of a method of targeting a directed energy device.

FIG. 9 depicts a sixth particular embodiment of targeting a directed energy system in which the curvilinear pattern 404 is modulated or dithered to determine whether the reflection signal 403 corresponds to the targeting location 406 being aligned with the center 401 of the curvilinear pattern 404. Several curvilinear patterns 404, 405 and 404' are illustrated. The first curvilinear pattern 404 (indicated by the dashed line) corresponds to the first reflection signal 403. The first curvilinear pattern 404 is undithered and unmodulated. For example, the first curvilinear pattern may be substantially the same as the curvilinear pattern 404 illustrated and discussed with reference to FIG. 6 where the curvilinear pattern 404 crosses the nose 408 of the target 402.

The second curvilinear pattern 405 is a modulated pattern. Modulating the pattern refers to elongating the pattern while keeping the center 401 of the curvilinear pattern 404 roughly stationary. For example, the unmodulated pattern 404 may be substantially circular and the modulated pattern 405 may be substantially elliptical. In a particular embodiment, where the target 402 has a long axis (e.g., along the center line) and a short axis (e.g., across the body), the modulated curvilinear pattern 405 is elongated along the long axis of the target. For example, the modulated pattern 405 may be elongated roughly along the center line of the target 402.

The third curvilinear pattern 404' corresponds to a dithered pattern. Dithering refers to shifting the center of the curvilinear pattern 404 from a first location (at 401) to a second location (at 401'). Thus, dithering changes the location of the center of the curvilinear pattern 404, while modulating changes the shape of the curvilinear pattern. In a particular embodiment, the curvilinear pattern is both dithered and modulated.

The reflection signal 403' corresponds to one complete dithered or modulated scan cycle. In a particular embodiment, when the curvilinear pattern 404 generates the first reflection signal 403 (having substantially equal periods of no reflection 456, 460, a relatively short reflection peak 462 and a relatively long reflection peak 458 as discussed with reference to FIG. 6) the center 401 of the curvilinear pattern 404 may be aligned with the targeting location 406. However, some targets may have local features (e.g., a sensors, antennas, radomes, pitot tubes, winglet, fin etc.) that may cause a similar pattern to the reflection signal 403 to be returned. To determine that the reflection signal 403 corresponds to alignment of the center 401 of the curvilinear pattern 404 with the targeting location 406, the curvilinear pattern 404 may be modulated or dithered. In particular embodiments, the curvilinear pattern may be modulated or dithered at a frequency less than the scan cycle. That is, the curvilinear pattern may vary continuously according to a modulation or dithering period that occurs over more than one scan cycle. Additionally, the curvilinear pattern may be dithered or modulated only after a reflection signal 403 is received indicating that the nose 408 of the target 402 may have been reached or the curvilinear pattern may be dithered or modulated continuously or occasionally.

The modulated or dithered curvilinear pattern 404', 405 may generate a reflected signal similar to the reflection signal 403'. That is, the reflection signal may include a relatively large period of no reflection 464 corresponding to the portion of the modulated or dithered curvilinear pattern 404', 405 that does not overlap by the target 402 and a single reflection peak 466 corresponding to a portion of the modulated or dithered curvilinear pattern 404', 405 that overlaps the target 402. Since the modulated or dithered curvilinear pattern 404', 405 extends beyond the nose 408 of the target 402, no reflection peak may be received from the nose 408. If a local feature were causing the relative short reflection peak 462 of the unmodulated and undithered curvilinear pattern 404, a reflection signal 403 more similar to the reflection signal 403 illustrated and discussed with reference to FIG. 5 may be expected. However, where the reflection signal 403 received from the unmodulated and undithered curvilinear pattern 404 is due to the curvilinear pattern 404 having reached the nose 408 of the target 402, the reflection signal 403' may be expected from the modulated or dithered curvilinear pattern 404', 405. The modulation or dithering of the curvilinear pattern may be accomplished over several scanning cycles, thus the reflection signal 403 and the reflection signal 403' may be separated by one or more complete scanning cycles or partial scanning cycles.

Figure 10:
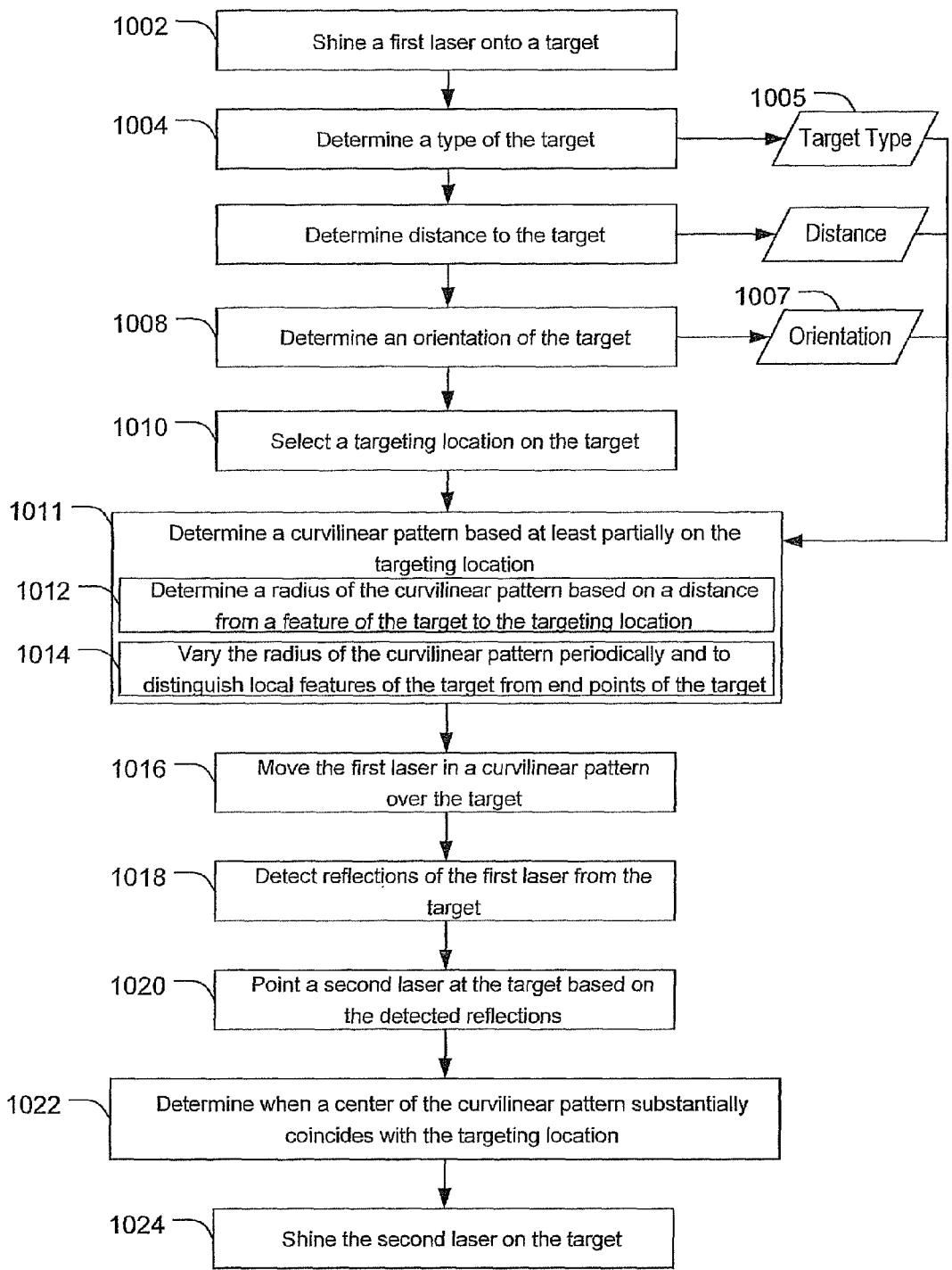
FIG. 10 is a flow chart of a particular embodiment of a method of targeting a directed energy device.

FIG. 10 depicts a flow chart of a first particular embodiment of a method of targeting a directed energy device. The method includes, at 1002, shining a first directed energy device, such as a first laser, onto a target. The first laser may be shined onto the target based on targeting information provided by targeting sensors. For example, the first laser may be shined on the target based on radar reflection signals, sonar reflection signals, optical detection signals or other electromagnetic or sound based targeting systems. The first laser may be a relative low power targeting laser which shares optics with a second laser. The second laser may include a relatively high power laser or high energy laser (HEL).

The method also includes, at 1004, determining a type of the target. The type 1005 of the target may include information about the geometry of the target, speed of the target, a targeting location on the target, other information about the target, or any combination thereof. In a particular embodiment, the type 1005 of the target may be determined based on the targeting information as described above. The method may also include, at 1008, determining an orientation 1007 of the target. The orientation 1007 of the target may be determined based on the targeting information, or may be determined based on reflected energy of the first laser.

In a particular embodiment, the method includes, at 1010, selecting a targeting location of the target. The targeting location of the target may be determined based on the type of the target 1005, the orientation of the target 1007, or other information related to the target or its position. The targeting location is a location on the target at which energy of the primary laser (or other directed energy device) should be pointed to damage, disable or destroy the target.

The method also includes, at 1011, determining a curvilinear pattern based at least partially on the targeting location. For example, the curvilinear pattern may be determined such that a radius of the curvilinear pattern corresponds to a distance from a feature of the target to the targeting location, at 1012. That is, when the curvilinear pattern crosses the feature, the center of the curvilinear pattern may correspond to the targeting location of the target. In another particular embodiment, determining the curvilinear pattern based at least partially on the targeting location includes modulating the curvilinear pattern. For example, at 1014, the radius of the curvilinear pattern may be varied periodically to distinguish local features of the target from the end points of the target. In another particular embodiment, determining the curvilinear pattern based at least partially on the targeting location includes dithering the curvilinear pattern. For example, the center of the curvilinear pattern may be shifted periodically to distinguish local features of the target from end point to the target.

The method also includes, at 1016, moving the first laser in the curvilinear pattern over the target. For example, the first laser may be scanned in the curvilinear pattern over the target and, at 1018, reflections of the first laser from the target may be detected. At 1020, a second directed energy device (e.g., a second laser) may be pointed at the target based on the detected reflections. For example, the second laser may be aligned with the first laser such that the second laser points substantially at the center of the curvilinear pattern.

In a particular embodiment, the detected reflections are analyzed to determine when the center of the curvilinear pattern substantially coincides with the targeting location, at 1022. When the center of the curvilinear pattern substantially coincides with the targeting location, the second laser may be shined on the target, at 1024.

Figure 11:
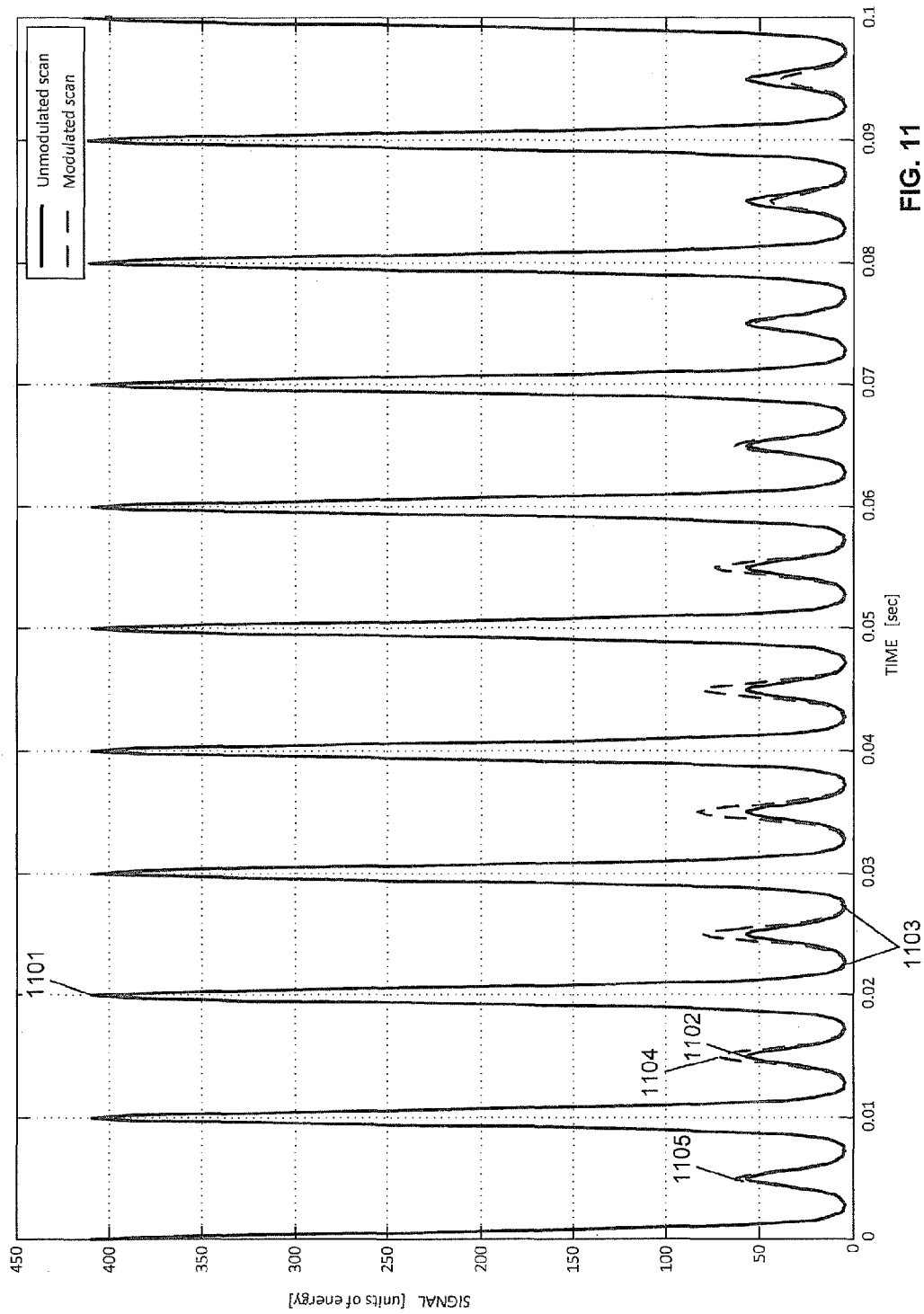
FIG. 11 is a diagram illustrating reflection signals from a targeting system.

FIG. 11 depicts reflection signals from a targeting system. The reflection signals simulate detected reflections of a targeting laser used to scan a target in a curvilinear pattern. The reflection signals include first reflections 1102 (shown in solid line) based on an unmodulated pattern and second reflections 1104 (shown in dashed line) based on a modulated pattern.

The simulated reflection signals 1102, 1104 include a plurality of large reflection peaks 1101 corresponding to reflections from a body of the target and a plurality of periods of no reflection 1103 corresponding to periods of time when the curvilinear pattern is not reflected by the target. The reflection signals also include a plurality of small reflection peaks 1105 corresponding to periods of time when the curvilinear pattern is reflected by a nose of the target or another portion of the target with a relatively small reflection cross-section.

The unmodulated reflection signals 1102 appear to indicate that the curvilinear pattern has reached the nose of the target. Accordingly, the center of the curvilinear pattern should correspond to the targeting location of the target. The modulated reflection signals 1104 show reflections from the target based on modulating the curvilinear pattern to determine whether the nose of the target has been reached or a local feature of the target has been reached. By analyzing the modulated reflection signals 1104 with respect to information about the curvilinear pattern, the targeting system may determine that the nose of the target has been reached and may shine a second laser on the target to strike the target location.

Although the systems and methods disclosed have been described primarily with respect to laser devices, the systems and methods may also be used to target other devices, such as a particle beams, masers, acoustic beams, or other directed energy devices. The targeting systems described may sense the full aperture of an outgoing beam and may not use any energy of the primary device (e.g., a high energy laser) for targeting. Rather a secondary device (e.g., a targeting laser) focuses through optics shared with the primary device. The primary device and the targeting device may have different frequencies to facilitate alignment of beams from each device and to facilitate detection of reflections from a target from each device.

While atmospheric disturbances can degrade targeting and/or effectiveness of some directed energy systems, embodiments disclosed herein may mitigate the effect of atmospheric disturbances as a result of the targeting laser and primary laser sharing optics. For example, the primary laser and targeting laser can be aligned at the laser optics, and therefore may be affected similarly by atmospheric conditions. Thus, when the targeting laser is centered about the targeting location based on reflections of the targeting laser, the primary laser is also aligned with the targeting location.

Additionally, the targeting system does not require power of the primary beam for sampling target location, thus conserving the power of the primary beam. Further, the targeting system uses the entire output aperture of the primary system and shares the optics of the primary laser. Thus, the targeting laser and the primary laser may be subject to similar errors that may arise in the optics such that alignment of the primary laser and the secondary laser limits error of the pointing direction and the pointing location of the primary laser.

In a particular embodiment, one or more of the functions of the directed energy systems discussed with reference to FIGS. 1-3, above may be implemented using software executed by a general purpose computing system. For example, the controller, scanning system, control system, target designation system, scan system tilt sensor, modulator, or demodulator of FIGS. 1-3, may include or be included within a computing system. In other particular embodiments, one or more functions of the directed energy systems may be implemented using dedicated hardware, such as application specific integrated circuits, programmable logic arrays and other hardware devices, constructed to implement one or more of the methods described herein. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations, or one or more method steps may be omitted. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments. Thus, the following claims are incorporated into the Detailed Description, with each claim standing on its own as defining separately claimed subject matter.

What is claimed is:

1. A system comprising:
   a first laser;
   a second laser; and
   a scanning system coupled to shared optics that are shared by the first laser and the second laser, wherein the scanning system is operable to use the shared optics to movably direct a second beam generated by the second laser in a pattern around a pointing location of a first beam generated by the first laser, and wherein the pattern includes a radius that is selected based on a distance from a feature of a target to a targeting location on the target.

2. The system of claim 1, wherein the first beam and the second beam have different frequencies.

3. The system of claim 1, further comprising a detector to:
   detect reflected energy of the second beam from the target; and
   provide a detection signal related to the reflected energy to a controller.

4. The system of claim 3, wherein the controller is adapted to determine when the first laser is pointed at the targeting location based on the detection signal.

5. The system of claim 1, further comprising a controller configured to confirm whether a center of the pattern substantially coincides with the targeting location by varying the radius of the pattern, a location of the center of the pattern, or a combination thereof.

6. The system of claim 1, wherein the second laser has a lower power than the first laser, and wherein the first laser comprises a high energy laser.

7. The system of claim 1, further comprising:
   a tilt sensor to detect alignment of the first laser and the second laser through the shared optics; and
   a beam expander to expand the first laser and the second laser.

8. A control system comprising:
   a detector interface to receive a detection signal including information about detected reflections of a targeting laser;

a scanning module to determine a curvilinear scanning pattern in which to move the targeting laser, wherein the curvilinear scanning pattern includes a radius that is selected based at least partially on a distance from a feature of a target to a targeting location on the target; and a targeting module to determine when a center of the curvilinear scanning pattern substantially coincides with the targeting location on the target based on the detected reflections.

9. The control system of claim 8, further comprising a tilt sensor adapted to detect an alignment the targeting laser and a different laser through shared optics, the shared optics shared by the targeting laser and the different laser.

10. The control system of claim 8, wherein the radius of the curvilinear scanning pattern is substantially equal to the distance from the feature of the target to the targeting location on the target.

11. The control system of claim 8, wherein the targeting module is adapted to distinguish one or more local features of the target from one or more end points of the target based on the detected reflections by periodic radius of the curvilinear scanning pattern.

12. The control system of claim 8, wherein the targeting module is adapted to distinguish one or more local features of the target from one or more end points of the target based on the detected reflections by varying a location of the center of the curvilinear scanning pattern.

13. The control system of claim 8, wherein the targeting module is adapted to, after determining that the center of the curvilinear scanning pattern substantially coincides with the targeting location, confirm that a particular local feature of the target has not been detected by varying the curvilinear pattern and distinguishing the particular local feature of the target from one or more end points of the target based on the detected reflections.

14. A method comprising:

determining a curvilinear scanning pattern based at least partially on a distance from a feature of a target to a targeting location on the target, wherein the curvilinear scanning pattern includes a radius that is selected based on the distance from the feature of the target to the targeting location on the target; and determining when a center of the curvilinear scanning pattern substantially coincides with the targeting location on the target based on detected reflections from the target.

15. The method of claim 14, further comprising receiving a detection signal including information about the detected reflections, wherein the detected reflections are reflections of a targeting laser from the target, and wherein the targeting laser is moved in accordance with the curvilinear scanning pattern.

16. The method of claim 14, wherein the radius of the curvilinear scanning pattern is substantially equal to the distance from the feature of the target to the targeting location on the target.

17. The method of claim 14, further comprising distinguishing one or more local features of the target from one or more end points of the target based on the detected reflections by varying a location of the center of the curvilinear scanning pattern.

18. The method of claim 14, further comprising, after determining that the center of the curvilinear scanning pattern substantially coincides with the targeting location, confirming that a particular local feature of the target has not been detected by varying the curvilinear scanning pattern and distinguishing the particular local feature of the target from one or more end points of the target based on the detected reflections.

19. The method of claim 14, further comprising moving a first laser in the curvilinear scanning pattern while a second laser is pointed at the center of the curvilinear scanning pattern.

20. The method of claim 14, further comprising adjusting the curvilinear scanning pattern based on a comparison of an expected reflection signal from the target to a received reflection signal from the target, wherein the expected reflection signal is determined based on geometric information regarding the target.

* * * * *